(12) United States Patent
Dumov et al.

(10) Patent No.: US 9,615,224 B2
(45) Date of Patent: Apr. 4, 2017

(54) ZERO TOUCH DEPLOYMENT OVER A WIRELESS WIDE AREA NETWORK

(71) Applicant: Cisco Technology, Inc., San Jose, CA (US)

(72) Inventors: Leo Dumov, Los Gatos, CA (US); Kiritkumar B. Joshi, Cupertino, CA (US); Vamsidhar Valluri, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/626,506

(22) Filed: Feb. 19, 2015

(65) Prior Publication Data

US 2016/0249186 A1  Aug. 25, 2016

(51) Int. Cl.
| | |
|---|---|
| *H04W 4/00* | (2009.01) |
| *H04W 4/12* | (2009.01) |
| *H04W 12/08* | (2009.01) |
| *H04L 1/00* | (2006.01) |
| *H04W 88/06* | (2009.01) |

(52) U.S. Cl.
CPC ............ *H04W 4/12* (2013.01); *H04L 1/00* (2013.01); *H04W 12/08* (2013.01); *H04W 88/06* (2013.01)

(58) Field of Classification Search
CPC ... H04W 12/08; H04W 84/045; H04W 68/02; H04W 48/02; H04W 48/20; H04W 12/06; H04W 60/00; H04W 64/003; H04W 72/0426; H04W 28/18; H04W 76/02; H04L 41/0803; H04L 65/1073; H04L 65/1069
USPC ...................................... 455/422.1
See application file for complete search history.

(56) References Cited

U.S. PATENT DOCUMENTS

| | | | |
|---|---|---|---|
| 7,420,933 B2 | 9/2008 | Booth, III et al. | |
| 8,161,540 B2 | 4/2012 | Mantripragada et al. | |
| 8,763,084 B2 | 6/2014 | Mower et al. | |
| 2010/0056104 A1* | 3/2010 | Butler | H04W 48/00 455/410 |
| 2010/0261467 A1* | 10/2010 | Chou | H04W 24/02 455/422.1 |
| 2013/0103807 A1* | 4/2013 | Couto | H04W 12/06 709/220 |
| 2014/0122674 A1 | 5/2014 | Gray et al. | |
| 2015/0003282 A1 | 1/2015 | Gourlay et al. | |

* cited by examiner

*Primary Examiner* — Kwasi Karikari
(74) *Attorney, Agent, or Firm* — Edell, Shapiro & Finnan, LLC

(57) ABSTRACT

Presented herein are techniques for enabling the zero touch deployment of devices having an integrated wireless wide area network (WWAN) interface. In one example, a device with a wireless wide area network interface is initialized and attaches to the wireless wide area network. The device receives, via the integrated wireless wide area network interface, a data message that includes a configuration file for the device. The device extracts the configuration file from the data message and uses the configuration file to perform configuration operations.

20 Claims, 5 Drawing Sheets

ZERO TOUCH DEPLOYMENT OVER A WIRELESS WIDE AREA NETWORK

TECHNICAL FIELD

The present disclosure relates to communication devices with wireless wide area network interfaces.

BACKGROUND

Mobile broadband routers, sometimes referred to herein simply as mobile routers, are wireless network access points that provide access to the Internet as an alternative to, for example, cable, digital subscriber line (DSL), and other wired services that may not be available in a location or are costly. A mobile router operates by tuning into a wireless wide area network, such as a third generation (3G), a fourth generation (4G), or other type of cellular network. A mobile router may communicate with local wireless computing devices using a wireless local area network (WLAN) technology, such as one of the Institute of Electrical and Electronics Engineers' (IEEE) 802.11 standards. Wireless computing devices may include, for example, laptop computers, desktop computers, tablet computers, mobile phones, etc. that have wireless networking capabilities.

DESCRIPTION OF EXAMPLE EMBODIMENTS

Overview

Presented herein are techniques for enabling the zero touch deployment of devices having an integrated wireless wide area network (WWAN) interface. In one example, a device with a wireless wide area network interface is initialized and attaches to the wireless wide area network. The device receives, via the integrated wireless wide area network interface, a data message that includes a configuration file for the device. The device extracts the configuration file from the data message and uses the configuration file to perform configuration operations.

Example Embodiments

In general, zero touch deployment (ZTD) refers to the ability to configure (i.e., set up) a device without the need for an administrator to log into and manually configure the device and without any initial configuration at the device. Presented herein are zero touch deployment techniques that make use of a wireless wide area network, such as a cellular network, to provide a device with a configuration file. As described further below, the configuration file is received via an integrated wireless wide area network interface of the device. For ease of illustration, the zero touch deployment techniques presented herein are described with reference to a particular device, namely a mobile router. The mobile router in the examples presented herein is connected to a specific wireless wide area network, namely a cellular network. However, it is to be appreciated that the zero touch deployment techniques presented herein may be used with other devices having wireless wide area network communication capabilities.

Figure 1:
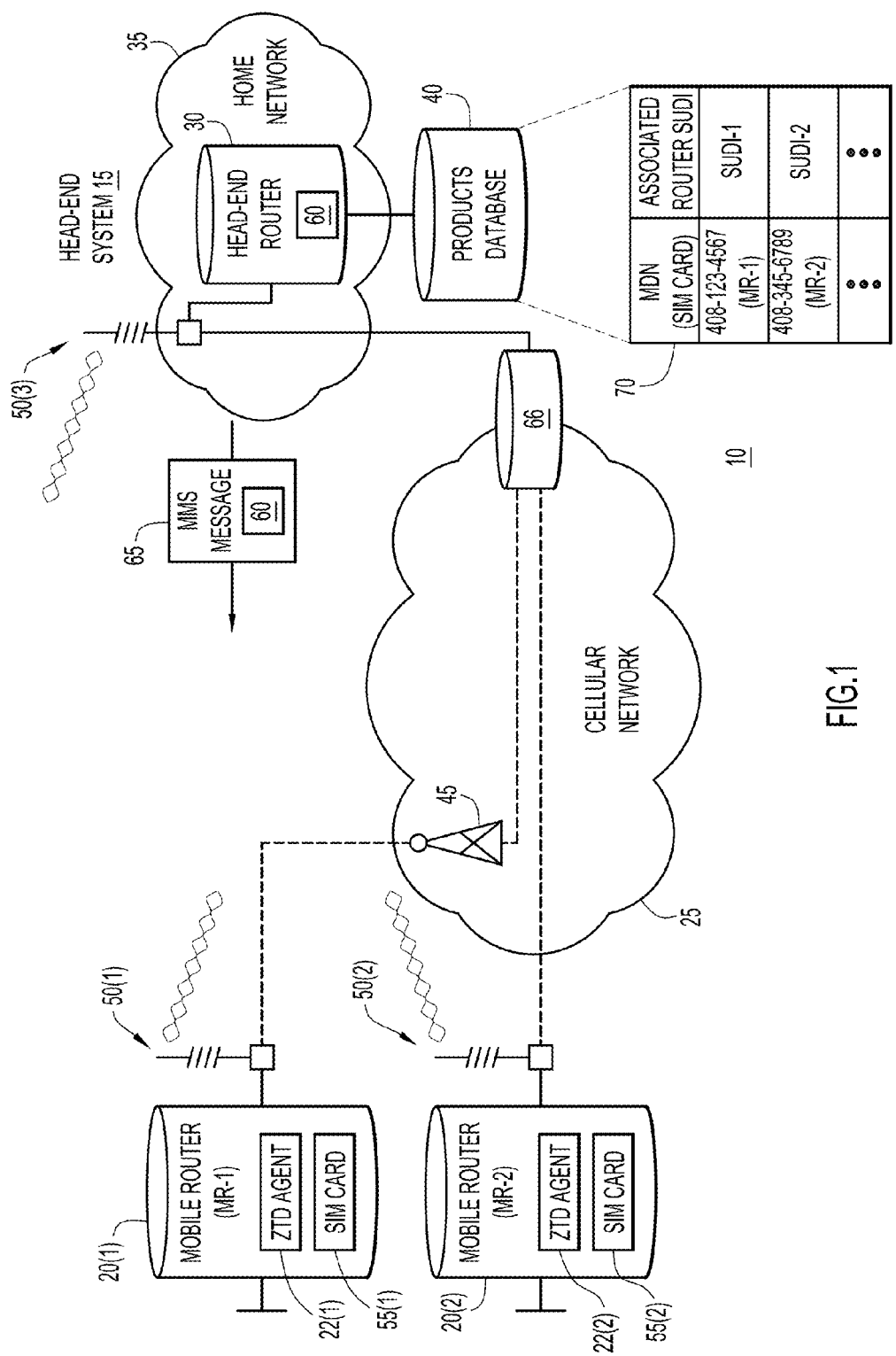
FIG. 1 is a schematic diagram of a system in which zero touch deployment techniques are deployed, in accordance with an example embodiment.

FIG. 1 is a schematic diagram of a system 10 in which zero touch deployment techniques in accordance with examples presented herein may be executed. In the example of FIG. 1, the system 10 includes a head-end system 15, two configurable mobile routers 20(1) and 20(2), and a wireless wide area network (e.g., cellular network) 25.

The mobile routers 20(1) and 20(2) each include a zero touch deployment agent 22(1) and 22(2), respectively. The head-end system 15 includes a head-end router 30, a home network 35 (e.g., wired or wireless network), and a products database 40. As described further below, the head-end system 15 is configured to send different configuration files to each of mobile routers 20(1) and 20(2) using the cellular network 25. The configuration files, which represent selected operating settings for each of the mobile routers 20(1) and 20(2), are used by the mobile routers 20(1) and 20(2) to perform self-configuration. This simplifies the deployment of the mobile routers 20(1) and 20(2).

The cellular network 25 may have a number of different arrangements and may, for example, support wireless communication according to the third generation (3G) standard, a fourth generation (4G) standard (e.g., Long-Term Evolution (LTE)), or another wide area wireless communication standard or technology. The cellular network 25 includes a plurality of cell sites/towers 45 that forward communications between different devices. For ease of illustration, only one cell site 45 is shown in FIG. 1. The mobile routers 20(1) and 20(2) each include a wireless wide area network interface, referred to herein simply as interfaces 50(1) and 50(2), respectively, and at least one subscriber identification module (SIM) card 55(1) and 55(2), respectively, associated with a valid cellular account (i.e., a cellular activated account with a cellular service provider ("carrier"). The SIM cards 55(1)/55(2) and interfaces modules 50(1)/50(2) enable the mobile routers 20(1) and 20(2), respectively, to communicate over the cellular network 25. Because the mobile routers 20(1) and 20(2) have at least one SIM card with an active cellular account, the mobile routers 20(1) and 20(2) each have an assigned mobile directory number (MDN) (e.g., telephone number) to which cellular text and data messages can be sent. An MDN is associated at the time when the cellular account is activated. As described further below, the cellular account could be potentially belong to the end user, the sender/manufacturer, etc.

Cellular networks, such as cellular network 25, support the exchange of cellular text and data messages. For example, cellular networks often support the Short Message Service (SMS) as well as the Multimedia Messaging Service (MMS). The SMS uses standardized communications protocols to allow devices to exchange short text messages. The MMS extends the core SMS capabilities in order to enable devices to exchange data messages (i.e., messages that include multimedia content such pictures, audio, video, rich text, etc.). The zero touch deployment techniques presented herein make use of cellular data messages, such as MMS messages, to send configuration files to the mobile routers 20(1) and 20(2) for self-configuration. For ease of description, further details of the zero touch deployment techniques are described with reference to mobile router 20(1) and the use of MMS messages.

The head-end system 15 is a provisioning system that generates and sends configuration files. In one illustrative example, the head-end system 15 is a system associated with the purchasing or ordering of mobile router 20(1). When mobile router 20(1) is manufactured, ordered, shipped, etc., the head-end router 30 generates a configuration file 60 for mobile router 20(1). The configuration file 60 is sent as the payload of an MMS message 65. That is, the head-end router 30 sends the MMS message 65, which includes the configuration file 60 as the MMS payload, to the mobile router 20(1). In one example, the head-end router 30 includes an interface 50(3) and is connected to the cellular network 25 via a wireless connection. In such examples, the head-end router 30 is enabled to send the MMS message 60 to be sent directly to mobile router 20(1) (enterprise-to-enterprise communication). In such examples, the head-end router is referred to as being connected "over the top" of the cellular network 25 because no special provisioning (e.g., business agreement between the head-end owner and the cellular network provider, other than a regular cellular) is needed to send the MMS message 65.

In alternative examples, the head-end router 30 does not include the interface 50(3), but is connected to the cellular core via a wired connection. In such examples, the head-end router 30 may use another device to send the MMS message 65 to the mobile router 20(1). In one such alternative arrangement, the head-end router 30 could send the configuration file 60 to router 66, which is connected directly to the cellular backend network (core network). The router 66 could then send MMS message 65 and the configuration file 60 to mobile router 20(1) through the core network (i.e., wired connection). In this example, the head-end system 15 has a direct business relationship with the cellular carrier (core network provider) or is part of the core network.

In accordance with examples presented herein, the configuration file 60 may be sent to the mobile router 20(1) at a number of different times and may be sent multiple times, as desired (i.e., initial configuration, re-configuring, etc.). One a feature of the zero touch deployment techniques is that the MMS message 65 can be sent before the mobile router 20(1) attaches to/registers with the cellular network 25. That is, the MMS message 65 can be pre-sent and the MMS message 65 will wait in a queue in the cellular network 25 until the mobile router 20(1) is powered up, before it is delivered to the mobile router 20(1). Once the mobile router 20(1) is powered up and synchronizes to the cellular network 25, the MMS message 65 is forwarded to the mobile router 20(1) for use by the zero touch deployment agent 22(1) in configuring the mobile router 20(1). The ability to pre-send the configuration file 60 as part of an MMS message 65 when, for example, the mobile router 20(1) is purchased/shipped, reduces the time needed to make the mobile router 20(1) operational. That is, when a user receives the mobile router 20(1), the user simply powers up the mobile router 20(1). Since the MMS message 65 is waiting in a queue in the cellular network 25, the MMS message 65 is forwarded to the mobile router 20(1) shortly after the mobile router is synchronizes to the cellular network 25 such that it is operational and ready to receive wireless transmissions via the via the cellular network 25, and this is made known to the infrastructure in the cellular network 25 upon synchronizing (so-called "attaching") to the cellular network 25. The zero touch deployment agent 22(1), upon receiving the MMS message 65, extracts the configuration file 60 and applies the configuration/settings to the router.

The MMS message 65 will be held in the cellular network 25 for the "lifetime" of the MMS message. That is, MMS messages have a lifetime (typically specified in days) after which the MMS message will expire and will be removed from/deleted by the cellular network 25. The lifetime of the MMS message 65 may be specified by the sender. The lifetime of an MMS message may be limited (i.e., eventually expires) or unlimited (i.e., does not expire).

Data transfer on cellular networks is inherently secure (i.e., MMS messages are secured during transmission on cellular network 25 using certain security protocols). As such, the configuration file 60 is inherently secure since it forms part of a secure MMS message 65. However, the zero touch deployment techniques presented herein add additional encryption to the configuration file 60 that may decoded only at the intended mobile router 20(1) using a security key that may only be obtained at the mobile router 20(1). In one example, the configuration file 60 is encrypted with a password that may be decoded using a unique device identifier, such as a Secure Unique Device Identifier (SUDI), that is associated with the host hardware/platform of the mobile router 20(1). As described further below, the unique device identifier, which forms the key that may be used to decrypt the configuration file 60, is not known to the zero touch deployment agent 22(1). However, the unique device identifier can be retrieved from an identity chip forming part of the mobile router's host platform using a platform application program interface (API). This API is employed by the zero touch deployment agent 22(1) to decrypt the configuration file 60 received as part of the MMS message 65.

As noted above, a device with an integrated wireless wide area network interface, such as mobile router 20(1), does not have any initial configuration. However, the mobile router 20(1) includes the zero touch deployment agent 22(1) as a part of the router's operating system (OS) (e.g., part of an Internetwork Operating System (IOS)). The zero touch deployment agent 22(1) detects receipt of the MMS message 65, receives the MMS payload (i.e., the configuration file 60) from the interface 50(1), and decrypts the MMS payload by retrieving the key from SUDI (i.e., loads and decode attachment with platform API that retrieve the SUDI key). The zero touch deployment agent 22(1) then applies the configuration file 60 to the mobile router 20(1). The configured mobile router 20(1) can acknowledge successful deployments with a message (e.g., SMS) to the head-end system 15.

The MDN of the SIM card 55(1) installed in mobile router 20(1) is pre-associated with the unique device identifier (e.g., SUDI) of the mobile router 20(1) at the products database 40 in head-end system 15. As such, the association between unique device identifier and MDN is known prior to sending the configuration file 60. FIG. 1 illustrates a table 70 that may be part of products database 40 that associates MDNs for mobile routers 20(1) and 20(2) with SUDIs for mobile routers 20(1) and 20(2).

FIG. 1 has been described with reference to the head-end system 15 as an ordering system that pre-sends the configuration file 60 to mobile router 20(1). It is to be appreciated that the head-end system 15 could be another type of system associated with mobile router 20(1). For example, the head-end system 15 could be part of a cloud-based portal employed by a provisioning system or a technical support system that enables technical support personnel to pre-send the configuration file 60. In these examples, the pre-sending of the configuration file 60 (i.e., sending before the mobile router 20(1) attaches to the cellular network 25) enables the mobile router 20(1) to self-configure at the time of the initial power up without waiting for involvement of technical support.

In certain examples, the provisioning device (i.e., the device that sends a configuration file) can be as simple as another router or smartphone with a cellular data link. As such, the zero touch deployment techniques presented herein may be useful for mobile routers used for machine-to-machine (M2M) purposes.

FIG. 1 also illustrates a specific example in which the mobile routers 20(1) and 20(2) each include one SIM card 55(1) and 55(2), respectively. It is to be appreciated that the mobile routers 20(1) and 20(2) may include additional SIM cards. For example, each mobile router 20(1) and 20(2) could include a SIM card associated with an enterprise (e.g., head-end system 25 operator) having a temporary cellular account. The MMS message 65 could be sent using the enterprise-associated SIM card and temporary cellular account. As such, the MDN and cellular account used for sending a configuration file to a device could potentially belong to the end user, the sender/manufacturer, etc.

As noted elsewhere herein, no initial configuration is needed in the mobile routers 20(1) for execution of the zero touch deployment techniques presented herein. The reason that no initial configuration is needed is that the mobile router 20(1) can receive of the MMS message 65 without an Internet Protocol (IP) address assignment to the router. The IP address is assigned to the modem internally to receive message payload.

Figure 2:
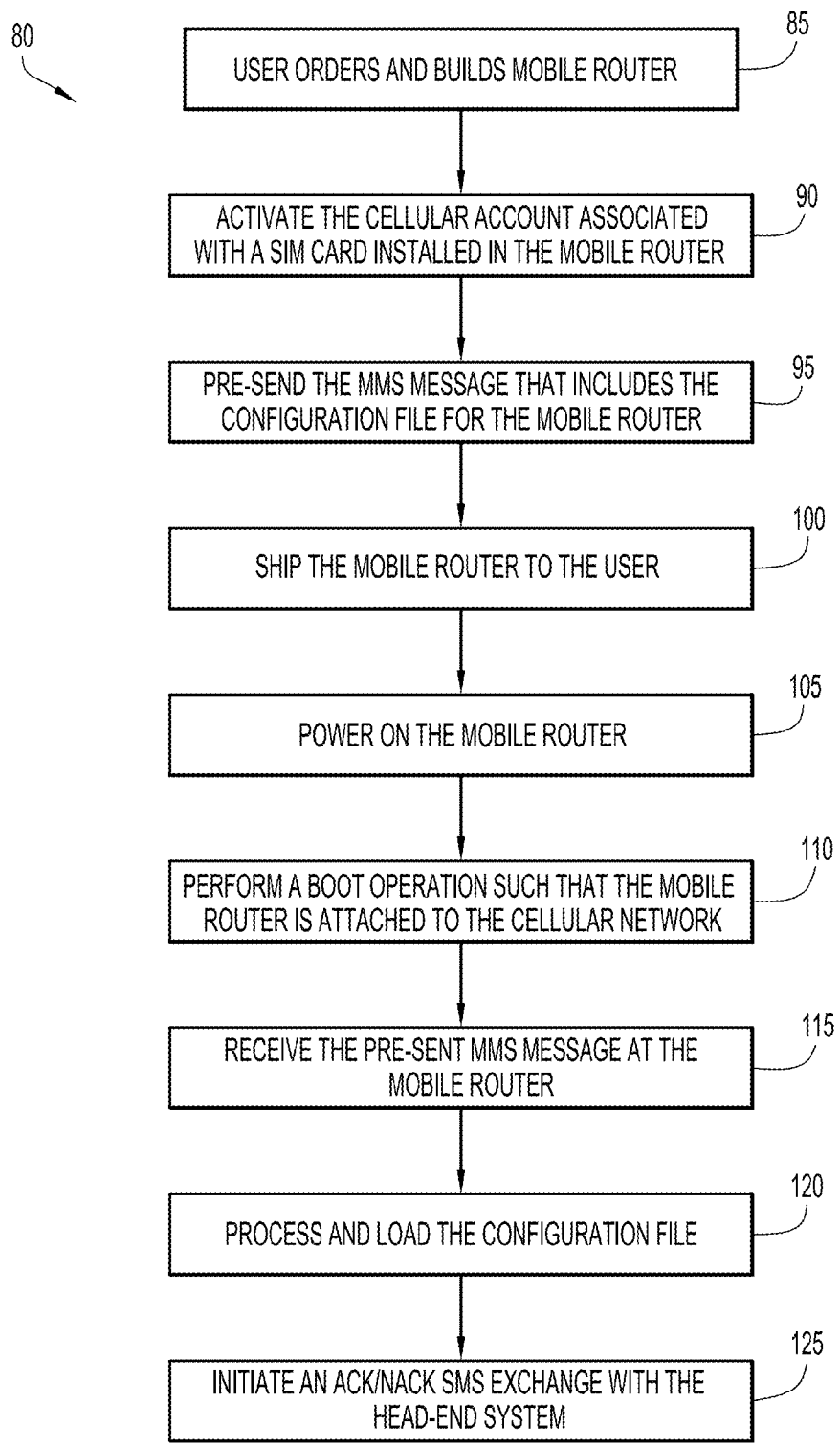
FIG. 2 is a flowchart of the zero touch deployment techniques, in accordance with an example embodiment.

FIG. 2 is a flowchart of a method 80 in accordance with a sample workflow for integration of the zero touch deployment techniques with an ordering or manufacturing system. To facilitate the explanation of the flow chart of FIG. 2, method 80 is described with reference to system 10 shown in FIG. 1. It is to be appreciated that the sample workflow of FIG. 2 demonstrates only one of many potential uses for the zero touch deployment techniques.

Method 80 begins at 85 where a user orders and builds a mobile router, e.g., mobile router 20(1). At 90, the head-end system 15 (or another system) activates the cellular account associated with a SIM card 55(1) installed in mobile router 20(1). Once the cellular account for SIM card 55(1) is activated, at 95 the head-end system 15 pre-sends the MMS message 65 that includes the configuration file 60 for mobile router 20(1). That is, the head-end system dispatches the MMS message 65 for transmission to the mobile router, but since the mobile router is not yet synchronized to the cellular network, it cannot actually be sent and the MMS message 65 is held (e.g., in a queue) waiting for the mobile router to synchronize to the cellular network 25 so that the cellular network 25 can expect the MMS message 65 to be delivered to the mobile router. In other words, the MMS message 65 is held within the cellular network 25 until the mobile router 20(1) "attaches" to the cellular network 25.

At 100, the mobile router 20(1) is shipped to the user and, at 105, the user powers on the mobile router 20(1). When powered on, at 110 the mobile router 20(1) will perform a boot operation and the mobile router 20(1) will synchronize ("attach") to the cellular network 25 such that it can send transmissions and receive transmissions in the cellular network 25. Once synchronized ("attached") to the cellular network, at 115, the mobile router 20(1) will (nearly immediately) receive the pre-sent MMS message 65 which has been held in the cellular network 25 awaiting attachment of the mobile router. At 120, the zero touch deployment agent 22(1) processes and loads the configuration file (i.e., extracts the configuration file, decrypts with SUDI, etc.). At 125, an Acknowledged/Not Acknowledged (ACK/NACK) SMS exchange may be initiated with the head-end system 15.

Figure 3:
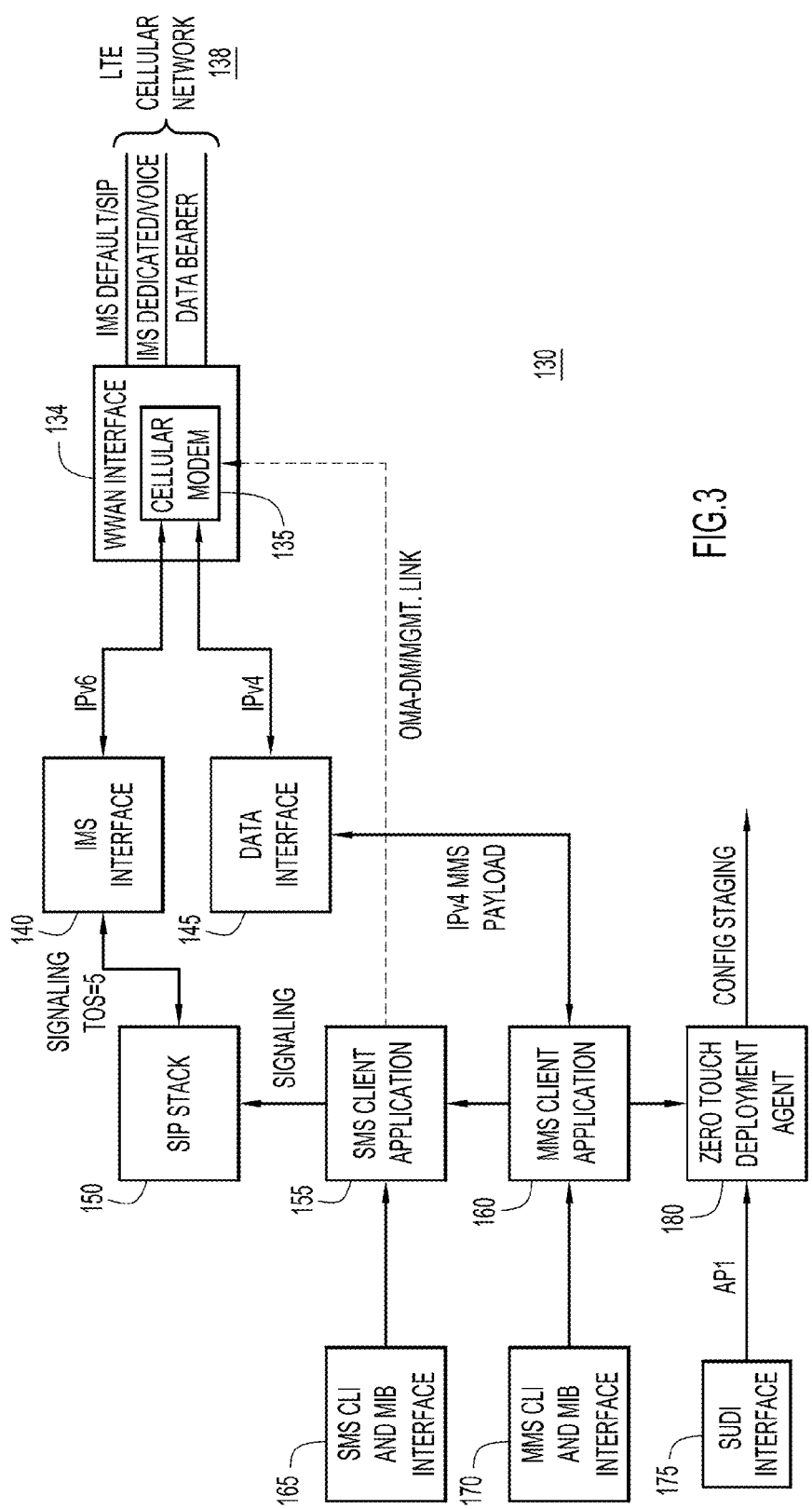
FIG. 3 is a schematic block diagram of a mobile router that executes the zero touch deployment techniques, in accordance with an example embodiment.

FIG. 3 is a schematic block diagram of one illustrative arrangement for a mobile router in accordance with examples presented herein. FIG. 3 is a high level diagram that relates specifically to Internet Protocol Multimedia Subsystem (IMS)-based implementations of the LTE communications. It is to be appreciated that the specific arrangement of FIG. 3 is illustrative and may be changed to accommodate other wireless wide area network communication mechanisms. For instance, initial deployments of the LTE do not use IMS, certain carriers use different method for SMS, etc., all of which may make use of the zero touch deployment techniques presented herein.

The elements of mobile router 130 generally match the elements for mobile router 20(1) of FIG. 1. However, for ease of illustration, FIG. 3 uses different reference numbers to refer to the mobile router and associated elements. The mobile router 130 includes a wireless wide area network interface ("WWAN interface") 134 that includes a cellular modem 135 that is configured for communication on an LTE cellular network 138 and a host platform 132 (i.e., the hardware platform of mobile router 130 other than the interface 134). An LTE cellular network may have different configurations for the same physical connection depending on the carrier. In one example, an LTE cellular network makes use of the IMS where there are multiple logical "bearers" or "channels." In a generic example, one IMS bearer may be allocated to voice communications (with some guaranteed Quality of Service (QoS)), another bearer may be allocated for default communications (e.g., best efforts, could be used for SIP or SMS), and another bearer may be used for data communications (e.g., MMS). Again, as noted, the specific use of IMS and arrangement of FIG. 3 is merely illustrative and the zero touch deployment techniques presented herein may be used with other wireless wide area network communication mechanisms.

The host platform 132 of the mobile router 130 includes an IMS interface 140, data interface 145, Session Initiation Protocol (SIP) stack 150, an SMS client application 155, an MMS client application 160, an SMS Command Line Interface (CLI) and management information base (MIB) interface 165 (e.g., CLI and 3G or 4G MIBs), an MMS CLI and MIB interface 170, a SUDI interface 175, and a zero touch deployment agent 180. The IMS interface 140, which operates in accordance with Internet Protocol version 6 (IPv6), is used for handing SMS messages received at cellular modem 135 and for SIP signaling. The data interface 145, which generally operates in accordance with Internet Protocol version 4 (IPv4), is used for handing MMS messages. It is to be appreciated that the data interface 145 may alternatively operate using IPv6. The MMS client application 160 operates with the data interface 145 to provide MMS payload (i.e., a configuration file received as part of an MMS message) to the zero touch deployment agent 180.

At least the zero touch deployment agent 180, the MMS client application 160, the SMS client application 155, and the SIP stack 150 are software processes in the mobile router's host operating system (OS) (e.g., IOS) that are launched at the time the router is booted/initialized (i.e., powered on). The cellular modem 135 is integrated with the host platform 132 via interfaces 140 and 145, thereby providing a cellular enabled mobile router. The IMS interface 140 operates as a management link between the host platform 132 and cellular modem 135, while the data interface 145 operates as a data link between the host platform 132 and cellular modem 135. The management link has a set of APIs to send management commands to the cellular modem and receive acknowledgements and/or asynchronous notifications.

Certain notifications from the cellular modem 135 will have APIs to inform the host platform 132 about received SMS and MMS messages. This may be used when the SIP signaling stack 150 is integrated in the cellular modem 150 rather than part of the host platform 132 (as shown in FIG. 3).

As noted, the mobile router 130 needs a valid SIM card and an activated cellular account with a cellular service provider ("carrier") in order to receive MMS messages. As a result, the mobile router 130 will have an assigned MDN (e.g., telephone number) to which SMS and MMS messages can be sent. When the mobile router 130 boots, the zero touch deployment agent 180 process will be launched. The zero touch deployment agent 180 registers to receive MMS/SMS notifications either from the cellular modem 135 via the management link or to the SMS/MMS agent in the host operating system 185, which communicates to the SIP stack 150 in the host platform 132. The zero touch deployment agent 180 also has the ability to use APIs to send SMS messages to the cellular modem 135.

When the zero touch deployment agent 180 is launched, the cellular modem 135 and the software interfaces 140/145 will be initialized by the host platform 132. The cellular modem 135 will search for the cellular network 138 and synchronize ("attach", register, etc.) thereto. At this point, assuming the cellular account associated with the SIM card (not shown in FIG. 3) installed in mobile router 130 is activated, the cellular modem 135 is enabled to receive SMS messages, MMS messages, etc.

After the mobile router synchronizes ("attaches") to the cellular network 138, an MMS message, which contains as a file attachment the configuration for mobile router 130, will be received by the cellular modem 135 and a notification will be sent to the host platform 132. The zero touch deployment agent 180 will receive the notification indicating that the MMS is available. When an MMS/SMS message is received by the mobile router, information associated the source/sender of the message (e.g., the source/sender MDN associated with the received MMS/SMS) can be screened by the cellular modem 135 or the zero touch deployment agent 180. More specifically, the cellular modem 135 or the zero touch deployment agent 180 may screen the source of the MMS/SMS to ensure that the source is a known or expected device (e.g., well-known MDN of an ordering system). The source screening feature may be used to drop messages that have a source MDN which does not match an expected value.

If the above-noted source/sender screening is not performed by the cellular modem 135, then source screening may be performed by the zero touch deployment agent 180 (i.e., compare the source MDN associated with the MMS message to verify the sender is an expected device). Once the source is validated through the source screening, the zero touch deployment agent 180 will issue API(s) to extract/obtain the MMS payload (configuration file).

After extracting the configuration file, the zero touch deployment agent 180 obtains SUDI credentials to decrypt the encryption applied to the configuration file by the head-end system. The zero touch deployment agent 180 obtains the SUDI credentials via the platform's SUDI APIs. That is, the credentials are obtained from the SUDI chip (not shown in FIG. 3) available in the mobile router's motherboard via a platform SUDI driver and library (i.e., SUDI interface 175). Once obtained, the SUDI credentials are applied to decode the configuration file received by the MMS APIs, assuming a known/pre-defined encryption algorithm.

FIG. 3 illustrates a specific example in which the unique device identifier credentials (i.e., SUDI credentials) are obtained from a chip on the host platform 132. In other examples, the unique device identifier credentials used to decrypt the configuration file are obtained from a vendor of the mobile router 130.

The zero touch deployment agent 180 may additionally validate the integrity or format of the configuration file (e.g., using checksum techniques, etc.). More specifically, the configuration file may be evaluated to ensure that it includes a pre-defined header and any other specified validation fields. The zero touch deployment agent 180 processes the decoded configuration file, and in the case of successful decoding and proper file format, the zero touch deployment agent 180 applies the configuration to the mobile router 130. Certain mobile routers have CLIs to copy a configuration file to the startup or running configuration, but other routers may use APIs. It is to be noted that the configuration file may contain a username and password for the specific mobile router to be able to copy the configuration. The configuration can be copied part-by-part or as the entire file. Once the configuration is successfully applied, the zero touch deployment agent 180 may initiate SMS communications back to the head-end system to provide the head-end system with a status update.

In certain examples, a failure may occur during processing or loading of the configuration filed. In the event of a failure, the MMS message that includes the configuration file can be re-sent by the head-end system. As an added security feature, an MMS message has a limited lifetime (typically specified in days) after which the MMS message will expire and will be removed from/deleted by the cellular network. If the MMS message is not received within the specified lifetime, the MMS message may expire and no longer will be delivered to the mobile router 130. In certain examples presented herein, the lifetime of the MMS can be specified at the time it is send by a head-end system.

FIG. 3 illustrates an arrangement in which the IMS bearers are exposed to the host operating system. As such, the SIP stack 150 is used to communicate with the cellular network (TOS based queuing/QoS used for IMS data and signaling) and the MMS client application 160 is used to obtain the MMS payload. The SMS client application 155 is moved from the cellular modem 135 to the host operating system and the MMS client application 160 rides "on top" of the SMS client. In other words, the MMS client application 160 forms part of the router/host platform 132, thereby bypassing any IMS stack in the cellular modem 135, and providing MMS related signaling over IMS bearers exposed to the platform. This is different from traditional arrangements in which the IMS channels are terminated by the cellular modem and are not exposed to the host platforms, and the entire IMS stack is executed inside the modem.

As noted, FIG. 3 illustrates one arrangement for a mobile router. In an alternative arrangement, the SMS and MMS client applications can be implemented in the cellular modem using a modem SIP stack.

Figure 4:
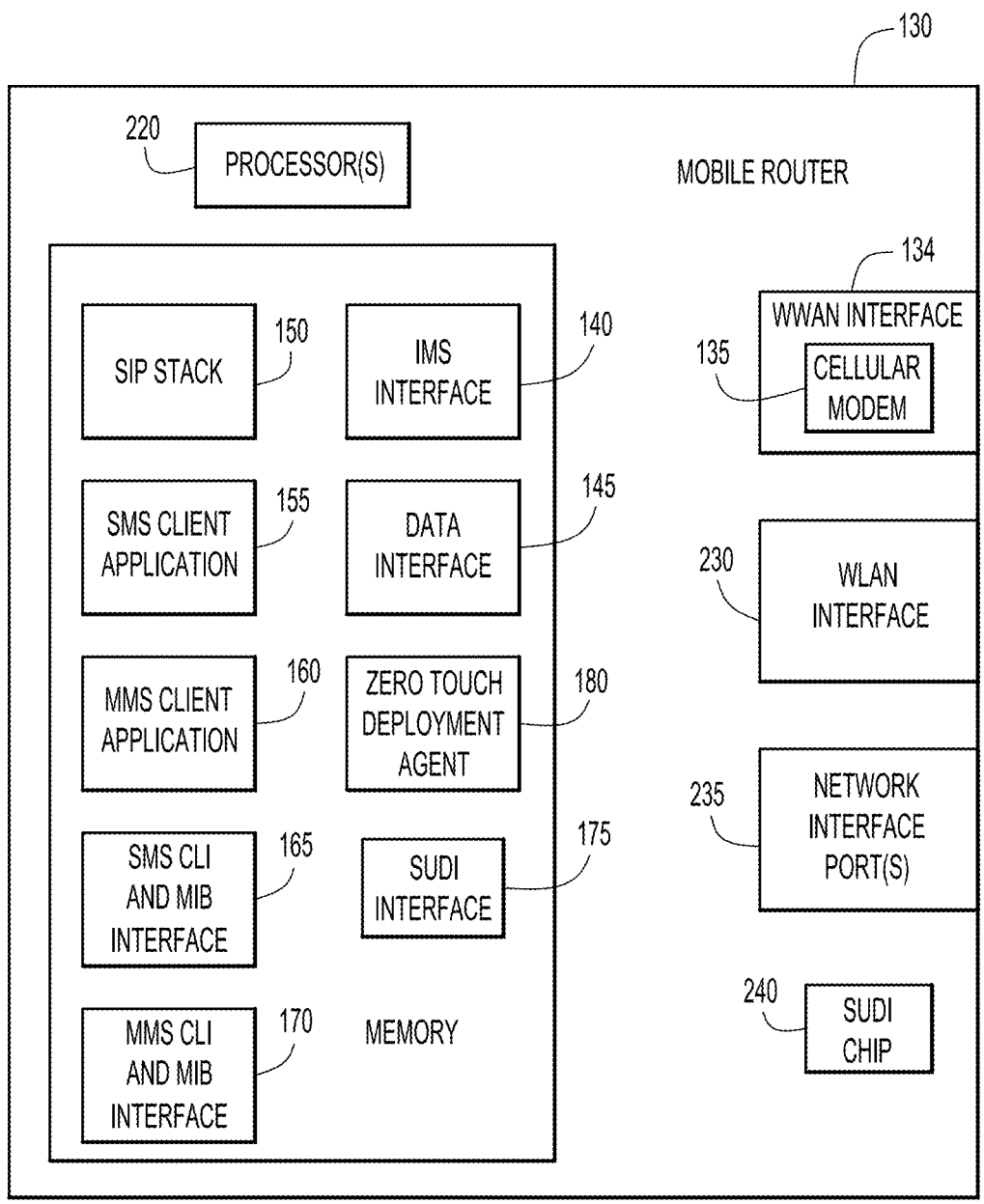
FIG. 4 is a functional block diagram of a mobile router that executes the zero touch deployment techniques, in accordance with an example embodiment.

FIG. 4 is a functional block diagram of the mobile router 130 of FIG. 3 that comprises the WWAN interface 134 and the host platform 132. In this example, the host platform 132*t* includes a host processor 220, a memory 225, a WLAN interface 230, one or more network interface port(s) 235, and a SUDI chip 240. The memory 225 includes the SMS CLI and MIB interface 165, the MMS CLI and MIB interface 170, the SIP stack 150, the SMS client application 155, the MMS client application 160, the SUDI interface 175, and the zero touch deployment agent 180. Memory 225 may comprise read only memory (ROM), random access memory (RAM), magnetic disk storage media devices, optical storage media devices. The host processor 220 is, for example, one or more microprocessors or microcontrollers that execute instructions for the SMS CLI and MIB interface 165, the MMS CLI and MIB interface 170, the SIP stack 150, the SMS client application 155, the MMS client application 160, the SUDI interface 175, and the zero touch deployment agent 180. Thus, in general, the memory 225 may comprise one or more tangible (non-transitory) computer readable storage media (e.g., a memory device) encoded with software comprising computer executable instructions and when the software is executed (by the host processor 220) it is operable to perform the operations described herein in connection with SIP stack 150, SMS client application 155, MMS client application 160, and zero touch deployment agent 180), SMS CLI and MIB interface 165, and MMS CLI and MIB interface 170.

Figure 5:
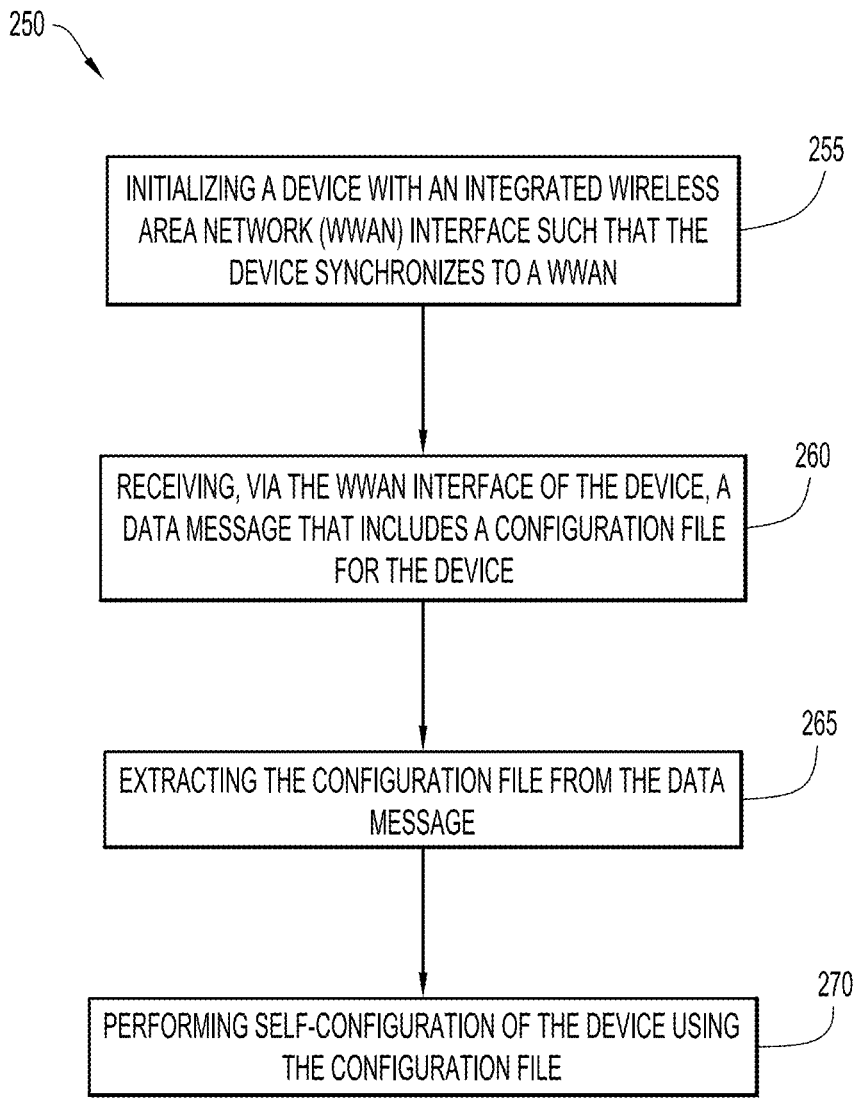
FIG. 5 is a high-level flowchart of a zero touch deployment method in accordance with an example embodiment.

FIG. 5 is a flowchart of a method 250 in accordance with examples presented herein. Method 250 begins at 255 where a device with an integrated wireless wide area network interface is initiated so as to attach to a wireless wide area network. At 260, the device receives a data message that includes a configuration file for the device via the wireless wide area network interface. At 265, the device extracts the configuration file from the payload of the data message. At 270, the device performs self-configuration using the configuration file.

The zero touch deployment techniques presented herein use secure MMS messages to send configuration files for a device, such as a mobile router, using a wireless wide area network, such as a cellular network. That is, the configuration file forms the payload of an MMS message sent over a cellular network. The MMS message is secured through the cellular network transmission mechanisms and is enhanced with additional encryption that may be decrypted only by the intended device. The zero touch deployment techniques provide a secure, reliable, and efficient system to provide configuration files to devices and eliminate the need for administrators to be on-site to configure the devices. The zero touch deployment techniques may be integrated with ordering, purchasing, manufacturing, technical support, or other head-end systems so as to enable the configuration file to be pre-sent (i.e., sent before the device attaches to/registers with the cellular network). Due to the fact that MMS messages may be held in a carrier network for a certain period of time (e.g., several days), in certain examples the configuration file may be sent even before the device is shipped to a user.

It is also to be appreciated that the configuration of a device may be modified multiple times using the zero touch deployment techniques presented herein. That is, the zero touch deployment techniques are not limited to use for initial configurations, but rather may also be used to deliver platform images, upgrades, etc.

Thus, in one form, a method is provided comprising: initializing a device with an integrated wireless wide area network (WWAN) interface such that the device synchronizes to a WWAN; receiving, via the WWAN interface of the device, a data message that includes a configuration file for the device; extracting the configuration file from the data message; and performing self-configuration of the device using the configuration file.

In another form, a device is provided comprising: a wireless wide area network (WWAN) interface; and a host platform comprising: a memory, and a processor coupled to the memory and configured to: synchronize to a WWAN using the WWAN interface, receive, via the WWAN interface, a data message that includes a configuration file for the device, extract the configuration file from the data message, and perform self-configuration of the device using the configuration file.

In still another form, one or more computer readable storage media are provided encoded with software comprising computer executable instructions and when the software is executed operable to initialize a device with an integrated wireless wide area network (WWAN) interface such that the device synchronizes to a WWAN; receive, via the WWAN interface of the device, a data message that includes a configuration file for the device; extract the configuration file from the data message; and perform self-configuration of the device using the configuration file.

The above description is intended by way of example only.

What is claimed is:

1. A method comprising:
   at a device having an integrated wireless wide area network (WWAN) interface:
   synchronizing to a WWAN using the integrated WWAN interface;
   after synchronizing to the WWAN, receiving, via the integrated WWAN interface, a data message, wherein the data message includes a configuration file for the device;
   extracting the configuration file from the data message;
   performing self-configuration of the device using the configuration file; and
   after self-configuration of the device using the configuration file, sending an acknowledgement to a sender of the data message.

2. The method of claim 1, wherein the data message is a Multimedia Messaging Service (MMS) message, and the configuration file is the payload of the MMS message.

3. The method of claim 1, wherein the data message is sent with a selected limited lifetime set by a sender after which the data message expires and is deleted by the WWAN.

4. The method of claim 1, wherein the data message is encrypted with a password that is only decodable using a unique device identifier associated with a host platform of the device.

5. The method of claim 4, further comprising:
   retrieving the unique device identifier using a platform application program interface (API) from a chip in the host platform of the device.

6. The method of claim 1, further comprising:
   sending the data message towards the device before the device attaches to the WWAN;
   holding the data message in the WWAN; and
   forwarding the data message to the device after the device attaches to the WWAN.

7. The method of claim 1, further comprising:
   screening source information associated with the data message to ensure that the source of the data message is an expected device.

8. The method of claim 1, wherein the integrated WWAN interface comprises a cellular modem and wherein the device includes a host platform that is separate from the cellular modem, and further comprising:
  obtaining the configuration file at the host platform using a data client application that is part of the host platform.

9. A device comprising:
an integrated wireless wide area network (WWAN) interface; and
a host platform comprising:
  a memory, and
  a processor coupled to the memory and configured to:
    synchronize to a WWAN using the WWAN interface,
    receive, via the integrated WWAN interface, a data message that includes a configuration file for the device,
    extract the configuration file from the data message,
    perform self-configuration of the device using the configuration file,
    after self-configuration of the device using the configuration file, send an acknowledgement to a sender of the data message.

10. The device of claim 9, wherein the data message is a Multimedia Messaging Service (MMS) message, and the configuration file is the payload of the MMS message.

11. The device of claim 9, wherein the data message is encrypted with a password that is only decodable using a unique device identifier associated with a host platform of the device.

12. The device of claim 9, wherein the processor is configured to:
  screen source information associated with the data message to ensure that the source of the data message is an expected device.

13. The device of claim 9, wherein the integrated WWAN interface comprises a cellular modem that is separate from the WWAN interface, and wherein the processor is configured to:
  obtain the configuration file from the cellular modem using a data client application that is part of the host platform.

14. The device of claim 9, wherein the data message is sent with a selected limited lifetime set by a sender after which the data message expires and is deleted by the WWAN.

15. One or more non-transitory computer readable storage media encoded with software comprising computer executable instructions and when the software is executed operable to:
  initialize a device with an integrated wireless wide area network (WWAN) interface such that the device synchronizes to a WWAN;
  receive, via the WWAN interface of the device, a data message that includes a configuration file for the device;
  extract the configuration file from the data message;
  perform self-configuration of the device using the configuration file; and
  screen source information associated with the data message to ensure that the source of the data message is an expected device.

16. The computer readable storage media of claim 15, wherein the data message is a Multimedia Messaging Service (MMS) message and the configuration file is the payload of the MMS message.

17. The computer readable storage media of claim 15, further comprising instructions operable to:
  send the data message to the device before the device attaches to the WWAN;
  hold the data message in the WWAN; and
  forward the data message to the device after the device attaches to the WWAN.

18. The computer readable storage media of claim 17, wherein the data message is sent with a selected limited lifetime set by a sender after which the data message expires and is deleted by the WWAN.

19. The computer readable storage media of claim 15, wherein the data message is encrypted with a password that is only decodable using a unique device identifier associated with a host platform of the device.

20. The computer readable storage media of claim 15, wherein the integrated WWAN interface comprises a cellular modem and wherein the device includes a host platform that is separate from the cellular modem, and further comprising instructions operable to:
  obtain the configuration file at the host platform using a data client application that is part of the host platform.

* * * * *